us010759488B2

(12) United States Patent
Liu et al.

(10) Patent No.: US 10,759,488 B2
(45) Date of Patent: Sep. 1, 2020

(54) QUICK LOCKING DEVICE FOR BICYCLE FRONT FORK, HANDLEBAR AND FRAME HEAD TUBE

(71) Applicant: Ningbo Tekmax Bicycle Co., Ltd, Ningbo, Zhejiang Province (CN)

(72) Inventors: Peng Liu, Cixi (CN); Xiaofei Zhao, Cixi (CN)

(73) Assignee: Ningbo Tekmax Bicycle Co., Ltd, Ningbo (CN)

( * ) Notice: Subject to any disclaimer, the term of this patent is extended or adjusted under 35 U.S.C. 154(b) by 288 days.

(21) Appl. No.: 15/979,702

(22) Filed: May 15, 2018

(65) Prior Publication Data
US 2019/0135370 A1   May 9, 2019

(30) Foreign Application Priority Data

Nov. 3, 2017 (CN) ...................... 2017 2 1449891 U

(51) Int. Cl.
*B62K 21/18* (2006.01)
(52) U.S. Cl.
CPC .................................. *B62K 21/18* (2013.01)
(58) Field of Classification Search
CPC ........ B62K 21/18; B62K 21/20; B62K 21/22; B62K 21/24
See application file for complete search history.

(56) References Cited

U.S. PATENT DOCUMENTS

| 379,258 A | * | 3/1888 | Torkelson | B62K 21/18 280/264 |
| 496,834 A | * | 5/1893 | Landis | B62K 21/20 403/93 |
| 3,955,828 A | * | 5/1976 | Boudreau | B62K 21/22 280/279 |
| 4,341,394 A | * | 7/1982 | Cabeza | B62K 21/18 280/279 |
| 5,003,839 A | * | 4/1991 | Yang | B62K 21/18 188/67 |
| 5,605,075 A | * | 2/1997 | Chi | B62K 21/16 280/279 |
| 6,322,283 B1 | * | 11/2001 | Chen | B62K 21/18 280/279 |
| 7,645,087 B1 | * | 1/2010 | Lin | B62K 21/18 403/109.5 |

(Continued)

FOREIGN PATENT DOCUMENTS

EP 3572312 A1 * 11/2019 ............. B62K 21/22

*Primary Examiner* — Kevin Hurley
*Assistant Examiner* — Conan D Duda
(74) *Attorney, Agent, or Firm* — Bay State IP, LLC

(57) ABSTRACT

This application discloses a quick locking device for a bicycle front fork, a handlebar and a frame head tube. A plastic part head assembly is installed at the bottom of the handlebar; the frame head tube is arranged below the plastic part head assembly, and the top of the frame head tube passes through the plastic part head assembly to be fixedly connected with the handlebar; a first installing hole is formed in the side surface of one side of the frame head tube; a second installing hole is formed below the first installing hole; a bicycle front fork tube is fixedly arranged inside the frame head tube through a spring buckle; the bicycle front fork is installed at the bottom of the bicycle front fork tube.

3 Claims, 4 Drawing Sheets

(56) References Cited

U.S. PATENT DOCUMENTS

| | | | | |
|---|---|---|---|---|
| 2002/0140203 | A1* | 10/2002 | Chen | B62K 15/006 |
| | | | | 280/287 |
| 2003/0034628 | A1* | 2/2003 | Chien | B62K 21/06 |
| | | | | 280/280 |
| 2004/0031349 | A1* | 2/2004 | Chen | B62K 21/24 |
| | | | | 74/551.3 |
| 2005/0206120 | A1* | 9/2005 | Liao | B62K 21/16 |
| | | | | 280/281.1 |
| 2006/0075604 | A1* | 4/2006 | Chang | B62K 21/18 |
| | | | | 16/421 |
| 2006/0076752 | A1* | 4/2006 | Montague | B62K 15/00 |
| | | | | 280/279 |
| 2006/0130605 | A1* | 6/2006 | Chen | B62K 21/12 |
| | | | | 74/551.1 |
| 2007/0138758 | A1* | 6/2007 | Chao | B62K 15/00 |
| | | | | 280/279 |
| 2007/0170690 | A1* | 7/2007 | Hermansen | B62K 21/06 |
| | | | | 280/280 |
| 2008/0264196 | A1* | 10/2008 | Schindler | B62K 21/06 |
| | | | | 74/493 |
| 2011/0243684 | A1* | 10/2011 | Chang | B62K 21/18 |
| | | | | 411/81 |
| 2013/0319169 | A1* | 12/2013 | Savard | B62H 5/06 |
| | | | | 74/551.8 |
| 2015/0151810 | A1* | 6/2015 | Chen | B62K 5/025 |
| | | | | 74/527 |
| 2016/0348702 | A1* | 12/2016 | Edwards | B62K 21/18 |
| 2018/0111657 | A1* | 4/2018 | Tsai | B62K 21/20 |
| 2018/0170471 | A1* | 6/2018 | Lin | B62K 21/18 |
| 2019/0135370 | A1* | 5/2019 | Liu | B62K 21/18 |
| 2019/0135371 | A1* | 5/2019 | Cheng | B62K 15/00 |
| 2019/0270492 | A1* | 9/2019 | Kang | B62J 1/08 |

* cited by examiner

QUICK LOCKING DEVICE FOR BICYCLE FRONT FORK, HANDLEBAR AND FRAME HEAD TUBE

CROSS REFERENCE TO RELATED APPLICATION

This application claims the benefit of and takes priority from Chinese Patent Application No. 201721449891.4 filed on Nov. 3, 2017, the contents of which are herein incorporated by reference.

TECHNICAL FIELD

The disclosure pertains to the technical field of quick locking, and specifically pertains to a quick locking device for a bicycle front fork, a handlebar and a frame head tube.

BACKGROUND

Bicycles, also called pushbikes or bikes, are usually two-wheel small ground vehicles. Bicycles can be used for riding instead of walking for traveling as environmentally-friendly vehicles; more and more people use bicycles as fitness equipment for riding exercise and bicycles traveling; cycling is also a sports competition, including road cycling, mountain cycling, track cycling, trick cycling and the like; there are a great variety of bicycles, including one-person bicycles, two-person bicycles and tandem bicycles.

A front fork part is located at the front position in a bicycle structure, the upper end of the front fork part is connected with a handlebar part, a frame part is matched with a front tube, and the lower end of the front fork part is matched with a front axle part, so that a guiding system of the bicycle is formed; at present, the assembling of the bicycle front fork, the frame head tube and the handlebar is locked through screws, the installation is extremely troublesome and wastes time and energy, and the screws can get loosened by rusting after long-term use, so that the safety performance of the bicycle is influenced; and moreover, the installation of the frame head tube of an existing bicycle front fork is free of a buckle type, and thus a quick locking device for a bicycle front fork, a handlebar and a frame head tube is disclosed for solving the above-mentioned problem.

SUMMARY

In order to solve the disadvantages existing in the prior art, the disclosure propose a quick locking device for a bicycle front fork, a handlebar and a frame head tube.

In order to achieve the above-mentioned purpose, the technical scheme adopted in the disclosure is as follows:

A quick locking device for a bicycle front fork, a handlebar and a frame head tube is disclosed; a plastic part frame head assembly is installed at the bottom of the handlebar; the frame head tube is arranged below the plastic part frame head assembly, and the top of the frame head tube passes through the plastic part frame head assembly to be fixedly connected with the handlebar; a first installing hole is formed in the side surface of one side of the frame head tube; a second installing hole is formed below the first installing hole; a bicycle front fork tube is fixedly arranged inside the frame head tube through a spring buckle; the bicycle front fork is installed at the bottom of the bicycle front fork tube; a first fixture block is installed on the spring buckle; a second fixture block is arranged below the first fixture block; the bicycle front fork is connected with the frame head tube through a bowl part; and a hook hole is formed in one side of the bottom of the handlebar.

Preferably, the spring buckle is of a U-shaped structure; the first fixture block and the second fixture block are positioned on the side surface of one side of the spring buckle respectively; the first fixture block is mutually matched with the first installing hole; and the second fixture block is mutually matched with the second installing hole.

Preferably, the bicycle front fork comprises two arc-shaped branch tubes; the two arc-shaped branch tubes are cone-shaped tubes respectively, and the diameters of the upper ends are greater than those of the lower ends; and supporting rods are installed at the bottoms of the two arc-shaped branch tubes respectively.

Preferably, the bowl part comprises an upper baffle, a first bead rack, a first steel bowl, a second steel bowl, a second bead rack and a lower baffle; the first bead rack is fixedly arranged at the bottom of the upper baffle; the second bead rack is fixedly arranged on the top of the lower baffle; the bottom of the first bead rack is welded with the first steel bowl; and the bottom of the first steel bowl is connected with the bottom of the second steel bowl.

Preferably, the hook hole is of an inverted U-shaped structure.

The disclosure has the beneficial effects that the plastic part head assembly is installed at the bottom of the handlebar, the frame head tube is pressed into the spring buckle inside the bowl part, the plastic part head assembly is pressed into the handlebar of the bowl part, the top of the frame head tube passes through the plastic part head assembly to be fixedly connected with the handlebar, the installation of the frame head tube and the handlebar is facilitated, the spring buckle is installed on the handlebar, the bicycle front fork tube is fixedly arranged inside the frame head tube through the spring buckle, the bicycle front fork is installed at the bottom of the bicycle front fork tube, positioning holes are formed in two sides of the bicycle front fork tube, and the bicycle front fork is conveniently and quickly inserted into the bicycle front fork tube; the quick locking device is reasonable in design and convenient in operation, quick installation for the bicycle front fork, the handlebar and the frame head tube is realized, a traditional installation way is changed, and the front fork is avoided from getting loosened when being used, so that the safety of a user is improved.

In the FIGs, 1, handlebar; 2, plastic part head assembly; 3, second installing hole; 4, frame head tube; 5, first installing hole; 6, spring buckle; 7, first fixture block; 8, second fixture block; 9, bicycle front fork tube; 10, hook hole; 11, bowl part; and 12, bicycle front fork.

DESCRIPTION OF EMBODIMENTS

The technical solutions according to embodiments of the disclosure are clearly and completely described in the following with reference to the accompanying drawings in the disclosure. Apparently, the embodiments in the following description are merely a part rather than all of the embodiments of the disclosure.

Figure 1:
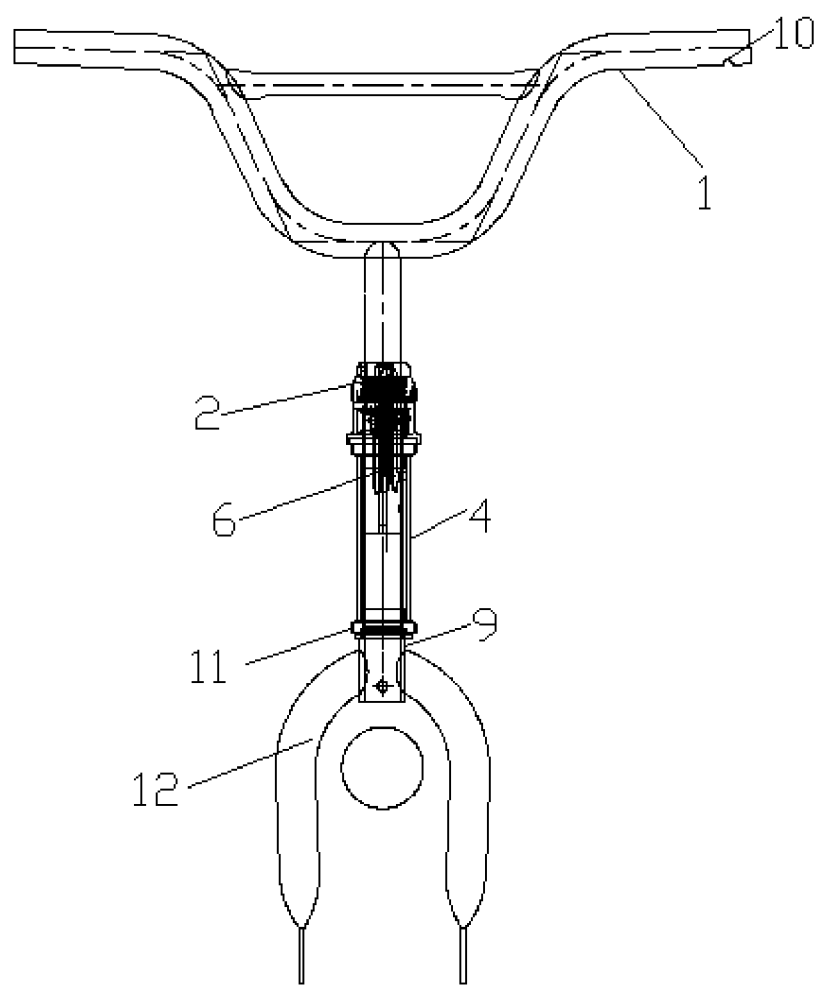
FIG. 1 is a structure diagram of a quick locking device for a bicycle front fork, a handlebar and a frame head tube proposed by the disclosure.
Figure 2:
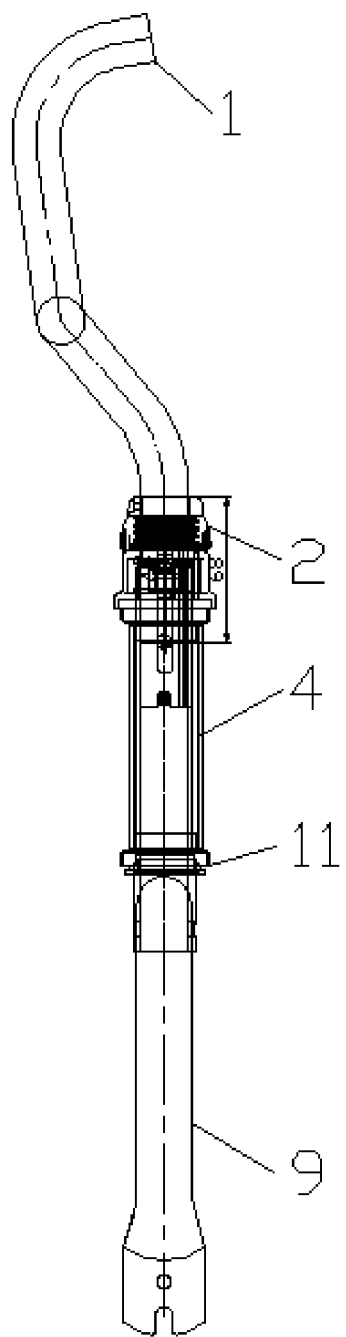
FIG. 2 is a side view of the quick locking device for the bicycle front fork, the handlebar and the frame head tube proposed by the disclosure.
Figure 3:
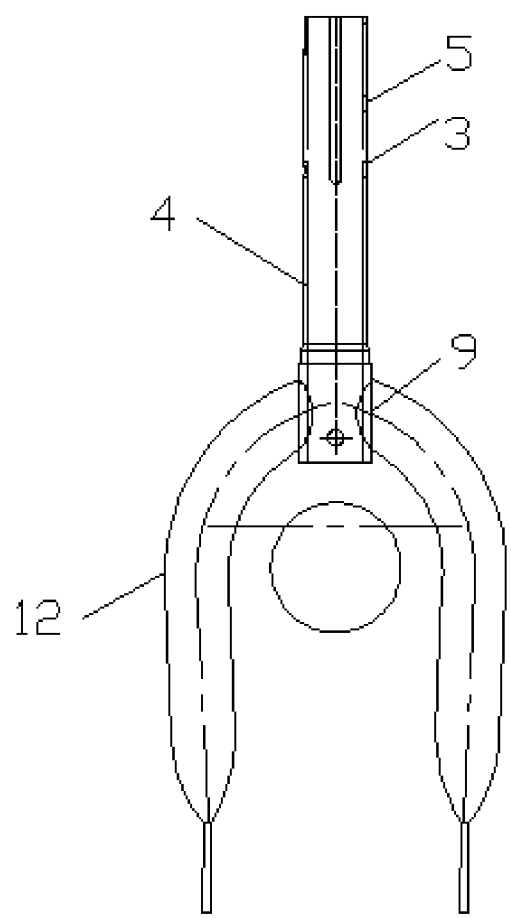
FIG. 3 is a part section of the quick locking device for the bicycle front fork, the handlebar and the frame head tube proposed by the disclosure.
Figure 4:
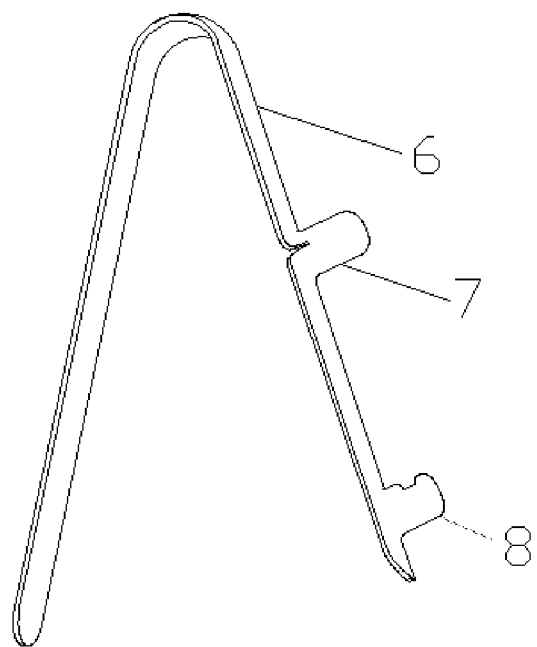
FIG. 4 is a structure diagram of a spring buckle in the quick locking device for the bicycle front fork, the handlebar and the frame head tube proposed by the disclosure.

Referring to FIG. 1 to FIG. 4, a quick locking device for a bicycle front fork, a handlebar and a frame head tube comprises the handlebar; a plastic part head assembly 2 is installed at the bottom of the handlebar 1; a frame head tube 4 is arranged below the plastic part head assembly 2, and the top of the frame head tube 4 passes through the plastic part head assembly 2 to be fixedly connected with the handlebar 1; a first installing hole 5 is formed in the side surface of one side of the frame head tube 4; a second installing hole 3 is formed below the first installing hole 5; a bicycle front fork tube 9 is fixedly arranged inside the frame head tube 4 through a spring buckle 6; the bicycle front fork 12 is installed at the bottom of the bicycle front fork tube 9; a first fixture block 7 is installed on the spring buckle 6; a second fixture block 8 is arranged below the first fixture block 7; the bicycle front fork 12 is connected with the frame head tube 4 through a bowl part 11; a hook hole 10 is formed in one side of the bottom of the handlebar 1; the plastic part head assembly 2 is installed at the bottom of the handlebar 1, the frame head tube 4 is pressed into the spring buckle 6 inside the bowl part 11, the plastic part head assembly 2 is pressed into the handlebar 1 of the bowl part 11, the top of the frame head tube 4 passes through the plastic part head assembly 2 to be fixedly connected with the handlebar 1, the installation of the frame head tube 4 and the handlebar 1 is facilitated, the spring buckle 6 is installed on the handlebar 6, the bicycle front fork tube 9 is fixedly arranged inside the frame head tube 4 through the spring buckle 6, the bicycle front fork 12 is installed at the bottom of the bicycle front fork tube 9, positioning holes are formed in two sides of the bicycle front fork tube 9, and the bicycle front fork 12 is conveniently and quickly inserted into the bicycle front fork tube 9; the quick locking device is reasonable in design and convenient in operation, quick installation for the bicycle front fork, the handlebar and the frame head tube is realized, a traditional installation way is changed, and the front fork is avoided from getting loosened when being used, so that the safety of a user is improved.

In the embodiment, the spring buckle 6 is of a U-shaped structure; the first fixture block 7 and the second fixture block 8 are positioned on the side surface of one side of the spring buckle 6 respectively; the first fixture block 7 is mutually matched with the first installing hole 5; the second fixture block 8 is mutually matched with the second installing hole; the bicycle front fork 12 comprises two arc-shaped branch tubes; the two arc-shaped branch tubes are cone-shaped tubes respectively, and the diameters of the upper ends are greater than those of the lower ends; supporting rods are installed at the bottoms of the two arc-shaped branch tubes respectively; the bowl part 11 comprises an upper baffle, a first bead rack, a first steel bowl, a second steel bowl, a second bead rack and a lower baffle; the first bead rack is fixedly arranged at the bottom of the upper baffle; the second bead rack is fixedly arranged on the top of the lower baffle; the bottom of the first bead rack is welded with the first steel bowl; and the bottom of the first steel bowl is connected with the bottom of the second steel bowl; and the hook hole 10 is of an inverted U-shaped structure.

In the embodiment, when the quick locking device is used, the plastic part head assembly 2 is installed at the bottom of the handlebar 1, the frame head tube 4 is pressed into the spring buckle 6 inside the bowl part 11, the plastic part head assembly 2 is pressed into the handlebar 1 of the bowl part 11, the top of the frame head tube 4 passes through the plastic part head assembly 2 to be fixedly connected with the handlebar 1, the installation of the frame head tube 4 and the handlebar 1 is facilitated, the spring buckle 6 is installed on the handlebar 6, the bicycle front fork tube 9 is fixedly arranged inside the frame head tube 4 through the spring buckle 6, the bicycle front fork 12 is installed at the bottom of the bicycle front fork tube 9, positioning holes are formed in two sides of the bicycle front fork tube 9, the bicycle front fork 12 is installed in the bicycle front fork tube 9, then the handlebar 1 is inserted into the bicycle front fork tube 9 of the front fork, the spring buckle 6 is automatically buckled into the positioning holes in the bicycle front fork tube 9, and then the plastic part head assembly 2 is screwed end, so that the bicycle front fork 12 is conveniently and quickly inserted into the bicycle front fork tube 9, and quick installation can be realized.

The above mentioned are only preferred specific embodiments of the disclosure. However, the scope of protection of the disclosure is not limited to the embodiments described herein. Any technicians skilled in the technical field are within the technical scope disclosed by the disclosure; and any replacements or modifications according to the technical schemes of the disclosure and ideas thereof all shall be included in the scope of protection of the disclosure.

What is claimed is:

1. A quick locking device for a bicycle including a front fork, a handlebar, and a frame head tube, the quick locking device comprising:
    a plastic part head assembly (2) fixedly connected to the handlebar (1), the plastic part head assembly (2) coupling the bottom of the handlebar (1) to the frame head tube (4), wherein the plastic part head assembly (2) is arranged generally above the frame head tube (4) with the top of the frame head tube (4) passing through the plastic part head assembly (2);
    the frame head tube (4) defining a first installing hole (5) formed in the side surface of one side of the frame head tube (4) and a second installing hole (3) formed below the first installing hole (5) on the same side surface of the frame head tube (4);
    a spring buckle (6) having a U-shaped structure and configured to fixedly couple a bicycle front fork tube (9) to the inside of the frame head tube (4), the spring buckle (6) comprising a first fixture block (7) and a second fixture block (8) arranged below the first fixture block (7), each of the first and second fixtures blocks are installed on the same side surface of the spring buckle (6), wherein the first fixture block (7) is mutually matched with the first installing hole (5); and the second fixture block (8) is mutually matched with the second installing hole (3);
    a bowl part (11) connecting the bicycle front fork tube (9) to the bottom of the frame head tube (4), the bicycle front fork (12) is installed at the bottom of the bicycle front fork tube (9); and a hook hole (10) is formed in one side of the bottom of the handlebar (1).

2. The quick locking device according to claim 1, wherein the bicycle front fork (12) comprises two arc-shaped branch tubes, each of the two arc-shaped branch tubes being cone-shaped respectively with the diameters of the upper ends being greater than the diameter of the lower ends; and further comprising supporting rods installed at the bottoms of the two arc-shaped branch tubes respectively.

3. The quick locking device according to claim 1, wherein the hook hole (10) is of an inverted U-shaped structure.

\* \* \* \* \*